United States Patent
Bortnikov et al.

(10) Patent No.: US 10,341,181 B2
(45) Date of Patent: Jul. 2, 2019

(54) METHOD AND APPARATUS TO ALLOW DYNAMIC CHANGES OF A REPLICA NETWORK CONFIGURATION IN DISTRIBUTED SYSTEMS

(71) Applicant: International Business Machines Corporation, Armonk, NY (US)

(72) Inventors: Vita Bortnikov, Haifa (IL); Zvi Cahana, Haifa (IL); Steven D. Clay, Round Rock, TX (US); Ifergan S. Shachor, Yokneam Eilit (IL); Ilya Shnayderman, Jerusalem (IL); Christopher P. Vignola, Port Jervis, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 233 days.

(21) Appl. No.: 15/062,862

(22) Filed: Mar. 7, 2016

(65) Prior Publication Data
US 2017/0257263 A1   Sep. 7, 2017

(51) Int. Cl.
| H04L 12/24 | (2006.01) |
| H04L 29/08 | (2006.01) |
| G06F 16/182 | (2019.01) |

(52) U.S. Cl.
CPC .......... *H04L 41/082* (2013.01); *G06F 16/184* (2019.01); *H04L 41/0846* (2013.01); *H04L 67/1097* (2013.01)

(58) Field of Classification Search
CPC ............. H04L 41/145; H04L 29/12113; H04L 61/1541; G06F 15/16; G06F 17/30575; G06F 17/509
USPC ........................... 709/202, 203, 220; 703/13
See application file for complete search history.

(56) References Cited

U.S. PATENT DOCUMENTS

| 6,542,907 B1 | 4/2003 | Cohen |
| 6,920,469 B2 | 7/2005 | Cooke et al. |
| 8,756,194 B1 | 6/2014 | Merrells |
| 9,026,559 B2 * | 5/2015 | Bernbo ............... G06F 11/1662 707/802 |
| 9,323,789 B1 * | 4/2016 | Elliott, IV ............. G06F 16/20 |
| 2004/0004945 A1 * | 1/2004 | Monsen ............ H04B 1/71052 370/328 |

(Continued)

*Primary Examiner* — Tesfay Yohannes
(74) *Attorney, Agent, or Firm* — Cantor Colburn LLP; Grant Johnson (57) ABSTRACT

A method and system for implementing a replica network configuration in a distributed system is provided. The system includes a memory having computer readable instructions, and one or more processors for executing the computer readable instructions. The computer readable instructions include generating a replica node that is assigned a computer readable storage medium and a processor, receiving, at the computer readable storage medium, a network configuration of the replica node from a system administrator, automatically generating, using the processor, a unique identifier (UUID) for the replica node, transmitting the UUID to a plurality of replica nodes of the distributed system arranged in the replica network configuration, and storing the UUID in the computer readable storage medium, wherein the computer readable storage medium is a persistent storage.

18 Claims, 7 Drawing Sheets

(56) References Cited

U.S. PATENT DOCUMENTS

| | | | |
|---|---|---|---|
| 2007/0124380 A1* | 5/2007 | Carr | H04L 67/1095 709/204 |
| 2009/0319247 A1* | 12/2009 | Ratcliffe, III | G09B 19/0053 703/13 |
| 2012/0218917 A1 | 8/2012 | Komarevtsen | |
| 2014/0046645 A1* | 2/2014 | White | G06F 17/509 703/13 |
| 2014/0067762 A1* | 3/2014 | Carvalho | G06F 16/27 707/636 |
| 2014/0074996 A1 | 3/2014 | Bortnikov et al. | |
| 2014/0359563 A1* | 12/2014 | Xie | G06F 8/34 717/106 |
| 2014/0366105 A1* | 12/2014 | Bradley | H04W 12/08 726/5 |
| 2015/0169417 A1 | 6/2015 | Brandwine et al. | |
| 2015/0280959 A1* | 10/2015 | Vincent | G06F 16/1774 709/203 |
| 2016/0269235 A1* | 9/2016 | Zimmermann | H04L 41/0806 |
| 2017/0039078 A1* | 2/2017 | Chen | G06F 9/44505 |
| 2017/0060865 A1* | 3/2017 | Hildebrand | G06F 16/2255 |
| 2017/0249373 A1* | 8/2017 | Dhananjay | H04L 67/1097 |
| 2018/0089248 A1* | 3/2018 | Guim Bernat | G06F 17/30581 |
| 2018/0123902 A1* | 5/2018 | Goertz | H04L 41/147 |

* cited by examiner

METHOD AND APPARATUS TO ALLOW DYNAMIC CHANGES OF A REPLICA NETWORK CONFIGURATION IN DISTRIBUTED SYSTEMS

BACKGROUND

The present disclosure relates generally to nodes in a distributed system and, more specifically, to a distributed system with nodes that allow dynamic changes.

In a distributed system, such as a distributed cache system, there are multiple nodes, which may be replicas, in communication with one another to collectively do work and share information. In many such systems, each of these nodes must be manually configured as a pre-deployment step. For example, each must have a unique identifier provided to them by a system administrator in order for them to properly interoperate. This is in addition to other elements that are also provided to the node by the system administrator. Accordingly, having to provide the identifier in addition to other elements puts additional burden on the administrator of this system, as they must ensure that each node is configured with an identifier and that no two nodes share the same identifier as the result of two nodes sharing an identifier may be difficult to discover and result in unpredictable consequences. Similarly, the network address of a node (hostname and port) is also generally statically defined by the system administrator which is an example of some other elements that the administrator provides the node. Further, when the configuration of the replica nodes needs to change, for example the network address, the entire system must be stopped, reconfigured and restarted.

Accordingly, there is a desire and need for a method and system to allow such setting to dynamically change, without requiring a restart of the distributed system.

SUMMARY

In accordance with an embodiment, a computer implemented method for implementing a replica network configuration in a distributed system is provided. The method includes generating a replica node that is assigned a computer readable storage medium and a processor, receiving, at the computer readable storage medium, a network configuration of the replica node from a system administrator, and automatically generating, using the processor, a unique identifier (UUID) for the replica node.

In addition to one or more of the features described above, or as an alternative, further embodiments of the method may include implementing a quorum based system in the replica network using the replica node and UUID including, generating a vote at the replica node, transmitting the vote and the UUID of the replica node to the system administrator, authenticating, at the system administrator, the vote and confirming the vote is from the replica node using the jointly received UUID.

In addition to one or more of the features described above, or as an alternative, further embodiments of the method may include transmitting the UUID for the replica node to a plurality of replica nodes of the distributed system arranged in the replica network configuration, receiving a plurality of UUIDs for the plurality of replica nodes, and storing the plurality of UUIDs in the computer readable storage medium.

In addition to one or more of the features described above, or as an alternative, further embodiments of the method may include including the UUID in communications with at least one of the plurality of replica nodes, wherein the plurality of replica nodes identify the replica node based on the UUID included in received communications.

In addition to one or more of the features described above, or as an alternative, further embodiments of the method may include receiving a communication from at least one of the plurality of replica nodes, and recognizing the at least one of the plurality of replica nodes based on at least one of a plurality of UUIDs included in the communication from the at least one of the plurality of replica nodes.

In addition to one or more of the features described above, or as an alternative, further embodiments of the method may include, wherein automatically generating the UUID for the replica node further includes receiving a plurality of UUIDs from a plurality of replica nodes on the distributed system, and generating the UUID for the replica node based on the plurality of UUIDs, wherein the generated UUID is different from each of the plurality of UUIDs.

In addition to one or more of the features described above, or as an alternative, further embodiments of the method may include, wherein automatically generating the UUID for the replica node further includes randomly generating the UUID as a randomly generated string of values.

In addition to one or more of the features described above, or as an alternative, further embodiments of the method may include storing the UUID in the computer readable storage medium, wherein the computer readable storage medium is a persistent storage.

In addition to one or more of the features described above, or as an alternative, further embodiments of the method may include, wherein the persistent storage includes a unique location reserved for the UUID.

In addition to one or more of the features described above, or as an alternative, further embodiments of the method may include, wherein the computer readable storage medium stores the plurality of UUIDs in a persistent storage portion of the computer readable storage medium.

In addition to one or more of the features described above, or as an alternative, further embodiments of the method may include, wherein the network configuration includes a host and a port.

In addition to one or more of the features described above, or as an alternative, further embodiments of the method may include dynamically updating the network configuration of the replica node.

In addition to one or more of the features described above, or as an alternative, further embodiments of the method may include, wherein dynamically updating the network configuration of the replica node includes changing the network configuration, pairing the changed network configuration and the UUID, and transmitting the paired network configuration and UUID to the plurality of replica nodes.

In addition to one or more of the features described above, or as an alternative, further embodiments of the method may include receiving a paired network configuration and UUID from the plurality of UUIDs from one of the plurality of replica nodes, and storing the paired network configuration and UUID in the computer readable storage medium.

In addition to one or more of the features described above, or as an alternative, further embodiments of the method may include storing a previous network configuration of the replica node in the computer readable storage medium, wherein the previous network configuration is stored until the updated network configuration is transmitted to a plurality of replica nodes of the distributed system arranged in the replica network configuration.

In accordance with an embodiment, a system for implementing a replica network configuration in a distributed system is provided. The system includes a memory having computer readable instructions, and one or more processors for executing the computer readable instructions. The computer readable instructions include generating a replica node that is assigned a computer readable storage medium and a processor, receiving, at the computer readable storage medium, a network configuration of the replica node from a system administrator, automatically generating, using the processor, a unique identifier (UUID) for the replica node, transmitting the UUID to a plurality of replica nodes of the distributed system arranged in the replica network configuration, and storing the UUID in the computer readable storage medium, wherein the computer readable storage medium is a persistent storage.

In addition to one or more of the features described above, or as an alternative, further embodiments of the system may include In addition to one or more of the features described above, or as an alternative, further embodiments of the system may include dynamically updating the network configuration of the replica node.

In addition to one or more of the features described above, or as an alternative, further embodiments of the system may include, wherein dynamically updating the network configuration of the replica node includes changing the network configuration, pairing the changed network configuration and the UUID, and transmitting the paired network configuration and UUID to the plurality of replica nodes.

In addition to one or more of the features described above, or as an alternative, further embodiments of the system may include receiving a plurality of UUIDs for the plurality of replica nodes, and storing the plurality of UUIDs in the computer readable storage medium.

In accordance with an embodiment, a computer program product for implementing a replica network configuration in a distributed system is provided. The computer program product including a computer readable storage medium having program instructions embodied therewith. The program instructions executable by a processor to cause the processor to generate a replica node that is assigned a computer readable storage medium and a processor, receive, at the computer readable storage medium, a network configuration of the replica node from a system administrator, automatically generate, using the processor, a unique identifier (UUID) for the replica node, transmit the UUID to a plurality of replica nodes of the distributed system arranged in the replica network configuration, and store the UUID in the computer readable storage medium, wherein the computer readable storage medium is a persistent storage, and dynamically update the network configuration of the replica node.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The forgoing and other features, and advantages of the invention are apparent from the following detailed description taken in conjunction with the accompanying drawings in which.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

A cloud computing environment is service implemented using an infrastructure comprising a network of interconnected nodes. Further, cloud computing may be a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 1:
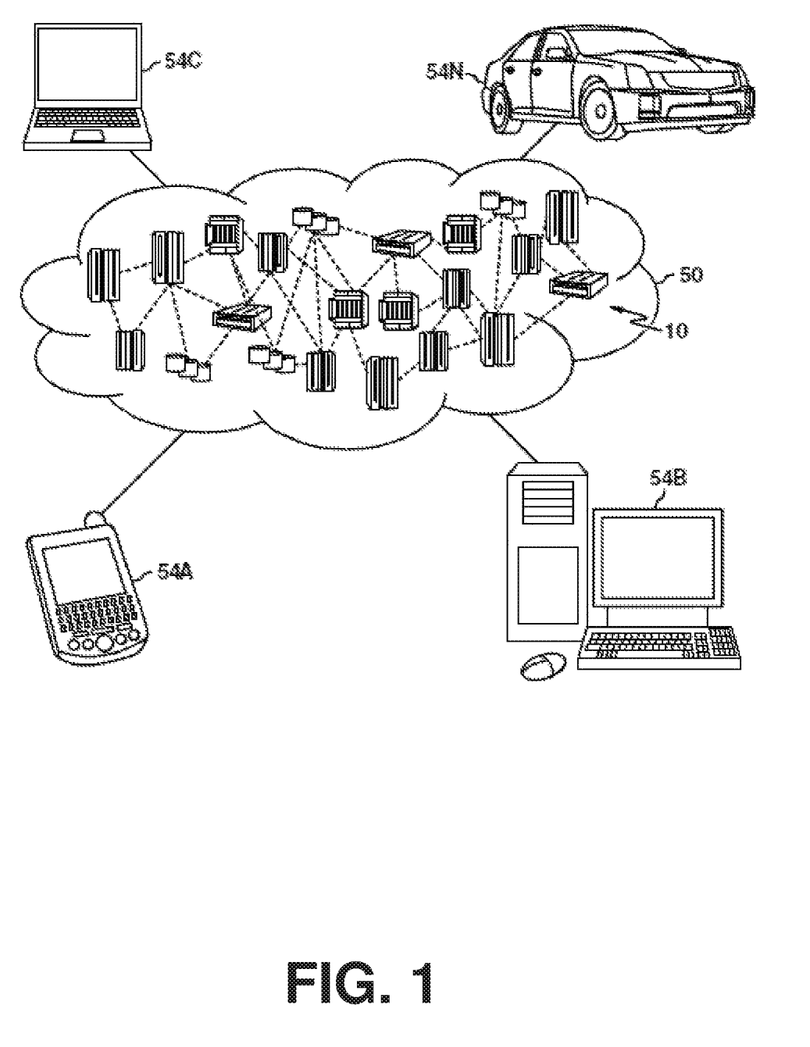
FIG. 1 depicts a cloud computing environment according to some embodiments of the present disclosure.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Further, one or more of the nodes 10 may be a replica of another node and can be grouped together to form a part of a distributed system such as a replica network or resource. For example, a node may be created that contains some or all of the data from another node. The data may include program instructions, metadata, stored data, and/or the like. A specific example of such a distributed system include a distributed cache that includes some nodes 10 that are replicas of each other and can be used as a distributed cache for storing and moving data.

Figure 2:
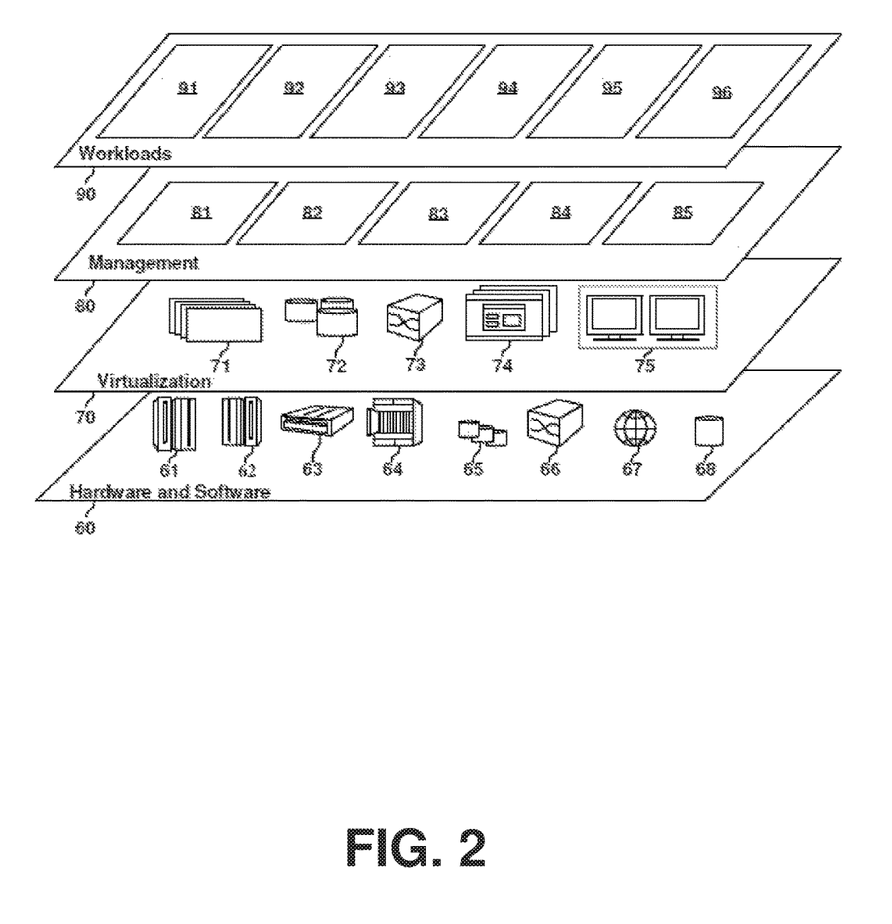
FIG. 2 depicts abstraction model layers according to some embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. According to one or more embodiments, one or more of these virtual entities can be implemented as a distributed system that can include a number of replica nodes.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and processing of messages across multiple communication systems 96.

In accordance with exemplary embodiments of the disclosure, methods, systems and computer program products for allowing dynamic changes of a replica network configured in a distributed system are provided. In exemplary embodiments, a replica network configured in a distributed system is configured to such that each replica node can generate a unique identifier itself.

Figure 3:
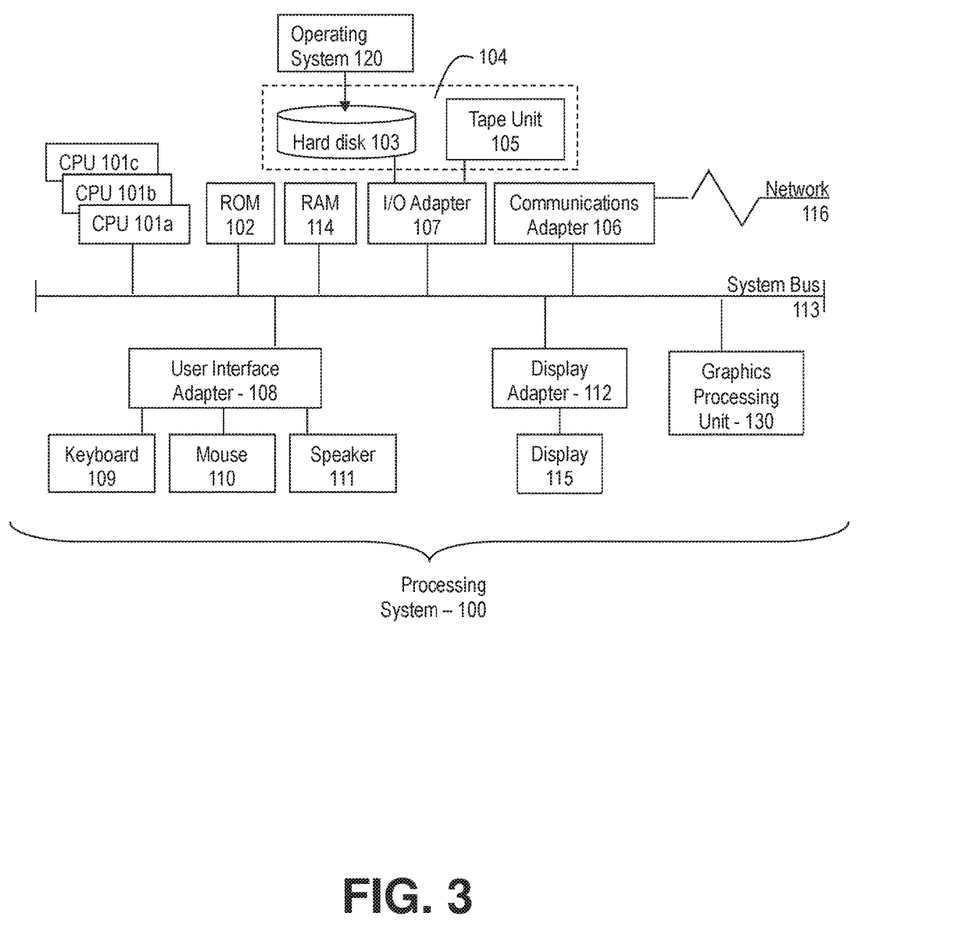
FIG. 3 depicts a block diagram illustrating one example of a processing system for practice of the teachings herein according to some embodiments of the present disclosure.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Embodiments described herein are directed to dynamic changes of a replica network configured in a distributed system. For example, various embodiments described herein provide for generation of unique identifiers for a replica node of the replica network within the distributed system. Additionally, embodiments provide runtime sharing of each replica's unique identifier, persisting of the unique identifier for each replica which helps provide resilience to failure, and storing historical configurations of the network setting.

Figure 4:
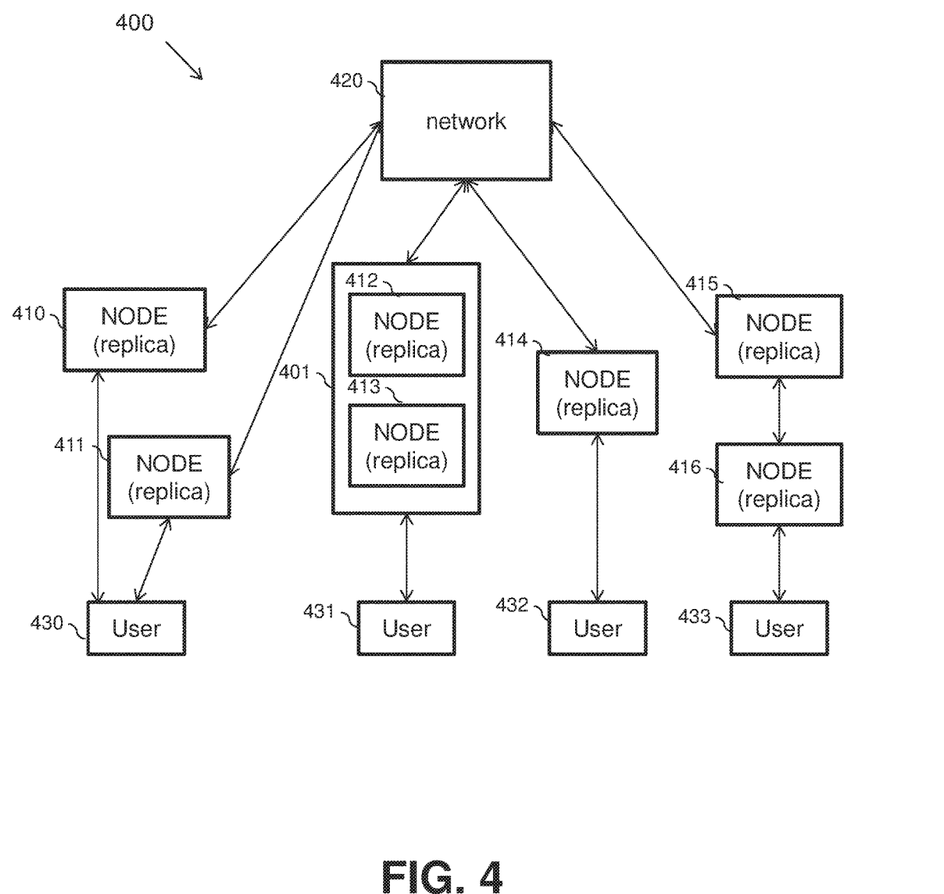
FIG. 4 depicts a block diagram of a replica network of nodes configured in a distributed system configured to allow dynamic changes in accordance with some embodiments of the present disclosure.

For example, turning now to FIG. 4, a block diagram of a replica network 400 of nodes 410-416 configured in a distributed system and configured to allow dynamic changes in accordance with some embodiments of the present disclosure is shown. As show, the replica nodes 410-416 may be arranged and connected in a number of different arrangements. For example, as shown, a node 410 may be connected in parallel with another node 411 with a user 430. The nodes 410 and 411 may also be connected in parallel with a network 420 which provides a path through which the nodes 410 and 411 can connect and communicate with each other and with other nodes 412-416 and users 431-433. The network 420 may include a number of communication elements that may include routers, servers, receivers, transmitter, and other elements to facilitate a connection. The network 420 may be a locally implemented network or may be part of the internet.

Further, according to another example, nodes 412 and 413 may be included within a host component 401. The host component 401 may be a specific physical computing device such as a computer, smartphone, server, or the like. Alternatively, the host component 401 may be a virtual machine that nodes 412 and 413 are associated and configured to be part of. The host component 401, and therefore both nodes 412 and 413, are connected to at least user 431 and to a network 420.

Further, a node 414 may be provided such that the node 414 is alone connected to a user 432 and a network 420. Therefore, the node 414 communicates with the other nodes that are part of the distributed system that node 414 is also part of through the network 420.

Further, in another example, nodes 415 and 416 can be connected in series with each other. For example, node 415 is connected to the network, node 416 is connected to a user, and node 415 is connected to 416 in series. Accordingly, node 415 can connect to the user 433 only by transmitting through the directly connected node 416. Similarly, node 416 can connect to the network 420 only by transmitting through the directly connected node 415.

In accordance with other embodiments, the replica nodes 410-416 can be arranged and connected in other arrangements and are not limited to the above disclosed examples. Further one or more of the nodes 410-416 may be disconnected and reconnected. Additionally, one or more of the nodes 410-416 may be moved and connected elsewhere in the overall distributed system. Further, new nodes may be created and connected anywhere in the shown replica network 400. Also, a single user could be shown connecting to all nodes, or alternatively, rather than a single user connected to each as shown, each node could have multiple users connected to them. Further, a user can use a replica node that the user is not connected to. For example, user 430 could use not only nodes 410 and 411 but could also use any of nodes 412-416 through the connection provided by the network 420 and between the nodes themselves.

Figure 5:
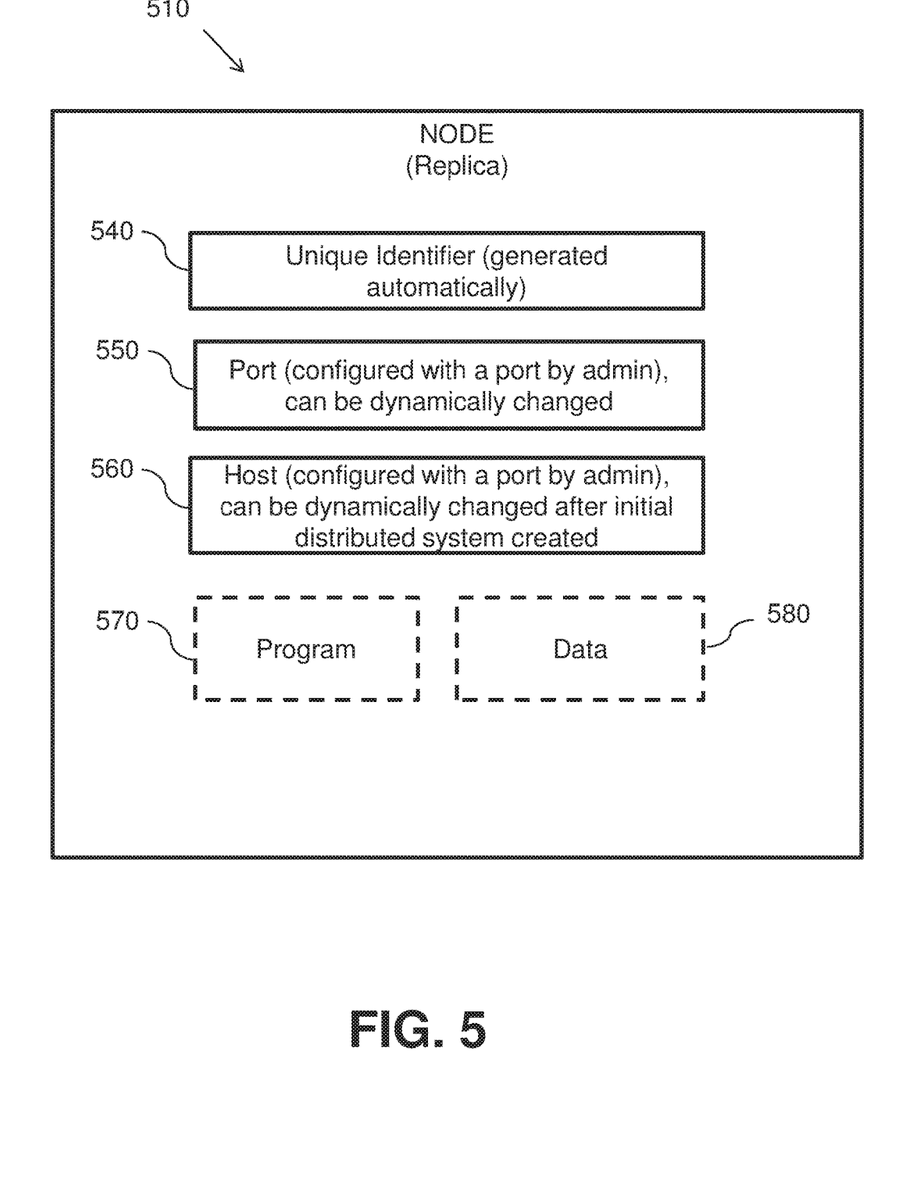
FIG. 5 depicts a replica node according to some embodiments of this disclosure.

FIG. 5 depicts a replica node 510 in accordance with one or more embodiments of this disclosure. As shown, a replica node 510 is created such that it includes at least a unique identifier 540. The unique identifier 540 is generated automatically by the replica node 510. The replica node 510 also includes a port 550. The port 550 is configured initially by a system administrator. However, after being implemented, the port 550 can still be dynamically changed as described below with limited to no guidance from the system administrator. The replica node 510 also includes a host 560. The host is configured by the system administrator as well. However, the host 560 can be dynamically changed with limited to no guidance from the system administrator after the initial distributed system is created as explained below.

Further, the replica node may also contain a program 570 and/or data 580. For example, the replica node can include the programs and data from the original node that was replicated to create the replica node 510. Specifically, the replica node 510 can be replicated to contain everything from the original node including any programs or stored data. The programs may include, for example, simple instructions, operation commands for how to process data, or complete complex software programs. The data may include host and port information for all other known nodes that the original node was aware of and had stored. The data may also include other data such as data that is desirably being redundantly stored, data for processing, or any other type of data that was present in the original node that was replicated. The replica node 510 may contain other elements as well depending on what was included in the original node.

Figure 6:
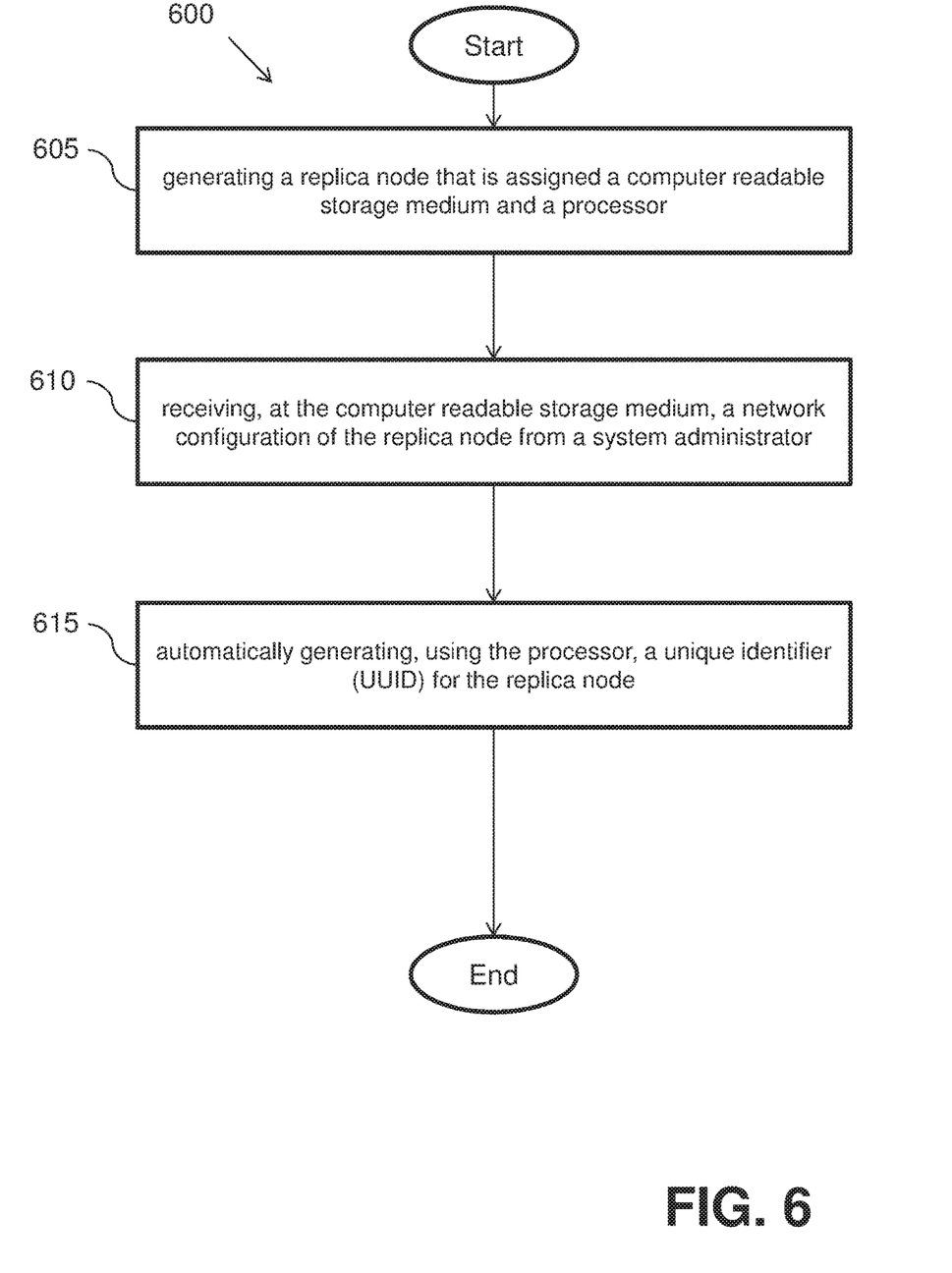
FIG. 6 depicts a process flowchart of a method for providing dynamic change capability to one or more nodes of a replica network configuration in a distributed system in accordance with some embodiments of the present disclosure.

FIG. 6 depicts a process flowchart of a method 600 for providing dynamic change capability to one or more nodes of a replica network configuration in a distributed system in accordance with some embodiments of the present disclosure.

The method 600 includes generating a replica node that is assigned a computer readable storage medium and a processor (operation 605). The method 600 also includes receiving, at the computer readable storage medium, a network configuration of the replica node from a system administrator (operation 610).

Figure 7:
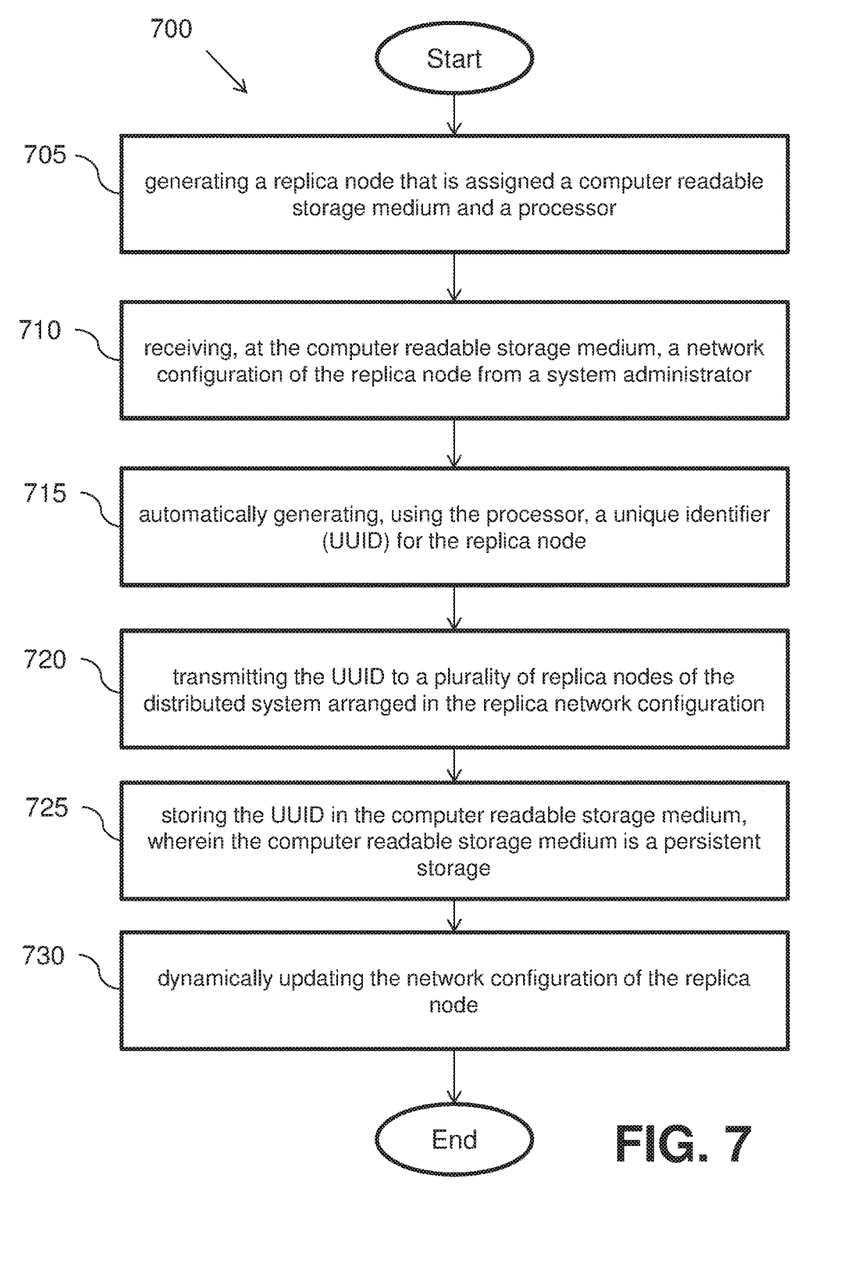
FIG. 7 depicts a process flowchart of a method for providing dynamic change capability to one or more nodes of a replica network configuration in a distributed system in accordance with some embodiments of the present disclosure.

Further, the method 600 also includes automatically generating, using the processor, a unique identifier (UUID) for the replica node (operation 615). According to one embodiment, automatically generating the UUID for the replica node can further include receiving a plurality of UUIDs from a plurality of replica nodes on the distributed system, and generating the UUID for the replica node based on the plurality of UUIDs, wherein the generated UUID is different from each of the plurality of UUIDs. Further, according to another embodiment, the method includes randomly generating the UUID as a randomly generated string of values. For example, in one embodiment, the unique identifier (UUID) can be a randomly generated string, which can also sometimes be called a replica UUID or replica UUID (herein after 'UUID'). Further, according to another embodiment, the UUID can be compared to the locally available UUIDs of other nodes to confirm no other replica nodes have the same UUID FIG. 7 depicts a process flowchart of a method 700 for providing dynamic change capability to one or more nodes of a replica network configuration in a distributed system in accordance with some embodiments of the present disclosure. The method 700 includes generating a replica node that is assigned a computer readable storage medium and a processor (operation 705). The method 700 also includes receiving, at the computer readable storage medium, a network configuration of the replica node from a system administrator (operation 710). Further, the method 700 includes automatically generating, using the processor, a unique identifier (UUID) for the replica node (operation 715). Additionally, the method 700 includes transmitting the UUID to a plurality of replica nodes of the distributed system arranged in the replica network configuration (operation 720), and store the UUID in the computer readable storage medium, wherein the computer readable storage medium is a persistent storage (operation 725). Further, the method 700 includes dynamically update the network configuration of the replica node (operation 730).

According to other embodiments, the method may include transmitting the UUID for the replica node to a plurality of replica nodes of the distributed system arranged in the replica network configuration. The method can also include receiving a plurality of UUIDs for the plurality of replica nodes and storing the plurality of UUIDs in the computer readable storage medium. Further the method can include the operation of including the UUID in communications with at least one of the plurality of replica nodes, wherein the plurality of replica nodes identify the replica node based on the UUID included in received communications. Further the method can include receiving a communication from at least one of the plurality of replica nodes and recognizing the at least one of the plurality of replica nodes based on at least one of a plurality of UUIDs included in the communication from the at least one of the plurality of replica nodes.

According to another embodiment, the method can include storing the UUID in the computer readable storage medium, wherein the computer readable storage medium is a persistent storage. Further, according to another embodiment, the persistent storage includes a unique location reserved for the UUID. According to another embodiment, the computer readable storage medium stores the plurality of UUIDs in a persistent storage portion of the computer readable storage medium. Further, the network configuration can include a host and a port.

According to one or more embodiments, the method may further include dynamically updating the network configuration of the replica node. Particularly, the method may include changing the network configuration, pairing the changed network configuration and the UUID, and transmitting the paired network configuration and UUID to the plurality of replica nodes. According to another embodiment, the method may further include receiving a paired network configuration and UUID from the plurality of UUIDs from one of the plurality of replica nodes, and storing the paired network configuration and UUID in the computer readable storage medium. According to another embodiment, the method can further include storing a previous network configuration of the replica node in the computer readable storage medium. The previous network configuration is stored until the updated network configuration is transmitted to a plurality of replica nodes of the distributed system arranged in the replica network configuration.

According to one or more embodiments, a method, apparatus, and/or system are disclosed that automatically provide a unique identifier for each replica node in a distributed system. This unique identifier can be used to provide dynamic updating of the network address of a replica node. Particularly, the embodiments disclosed herein enable dynamic updating of the network address of a replica in a distributed system configuration by using the unique identifier in the dynamic updating processes to identify and update the replica node.

According to another embodiment, the generation of a unique identifier by a replica node for the replica node can help implement a quorum based system in a distributed system. For example, by having unique identifiers that are automatically generated, each node can vote while also providing the unique identifier to help facilitate voting accuracy and ease of implementation.

Particularly, one or more embodiments include generation of the unique identifier for a replica node, runtime sharing of each replica node's unique identifier, persisting of the unique identifier for each replica node for resiliency to failure, and storing historical configurations of the network settings, as long as they may be useful.

Specifically, one or more embodiments provide for the generation of the unique identifier for the replica node by the replica node. Said another way, as part of the first time initialization of a replica node, the replica node generates a unique identifier (UUID) for itself. For example, according to an embodiment, a replica node can determine if the current bring-up is a first time initialization by the absence of its own persisted storage. According, in the case where the replica node detects that it has been first initialized, the replica node will generate its own UUID. For example, in one embodiment, the unique identifier (UUID) can be a randomly generated string, which can also sometimes be called a replica UUID or replica UUID (herein after 'UUID'). Further, according to another embodiment, the UUID can be compared to the locally available UUIDs of other nodes to confirm no other replica nodes have the same UUID.

Additionally, according to one or more embodiments, a replica node includes runtime sharing of the replica's unique identifier. Particularly, in distributed systems as described, when a replica node is first initialized or starts the replica node tries to establish connections with every other replica node it has knowledge of. The replica node may have data, including UUIDs, host, and port information, of other replica nodes provided to the replica node as part of the replication process when creating the replica node from an original node that contained the data. According to one embodiment, once enough connections are established between replica nodes such that all the nodes collectively know of each other the system can become operational. In another embodiment, through handshaking between the replica nodes, the replica nodes can also share their UUIDs with one another. The result is that a replica node gains knowledge of the UUID of every replica node it has connected with.

Further, according to one or more embodiments, the other replica nodes now know the UUID of the replica node, as well. Further, according to one or more embodiments, the UUID can used for every communication between replicas, with each replica always including its own UUID in all of its communication to other replicas as a way of identifying itself.

In one or more embodiments, the replica nodes can include the feature of persisting unique identifiers. Specifically, once a UUID has been created for a replica node, the replica node persists this identifier in its own persistent storage in a unique location reserved for its own UUID. Persistent storage is any data storage device that retains data after power to that device is shut off. It is also sometimes referred to as non-volatile storage.

Additionally, according to one or more embodiments, the unique identifiers of all other known replica nodes are also persisted by each individual replica node. In one implementation, the persistence of these other replica identifiers is coupled with the network information necessary to connect with each replica as a triplet that includes the UUID, hostname, and port. According to one embodiment, when the entire system initially starts, none of the replica identifiers (UUID) have been generated. So at 1st bring-up, the triplet for each replica node only contains the hostname and port. As the UUIDs become known, the triplet is updated with this information.

In one or more embodiment, for maximum up-time, replica nodes are further able to change their network configuration. For example the replica nodes can change their hostname and port. Further, the replica nodes can make the changes without requiring a restart of the replica or the entire system. Particularly, the use of UUIDs makes this possible as a replica node that has changed its network information can then communicate this to other replica nodes in the system by pairing its new network information with its already known UUID in the triplet (UUID, host, port). Without the UUID the other replicas would not be able to identify the replica that has changed its host and port, as a replica they are already in communication with. Accordingly, as other replica nodes receive this information, they can update their own storage of this new network information for the changed replica node.

Further, according to one or more embodiments, the replica node is configured to store historical configurations. Particularly, the replica node can temporarily keep a history of its own previous hostname and port. Because the hostname and port of replica nodes can be dynamically reconfigured, the replica node can temporarily keep a history of its own previous hostname and port for using during transition periods during reconfiguring. Particularly, the replica node can handle a case such as another replica node sending a message to this replica node by identifying this replica node with the old hostname and port. For example, this transmission would occur before the changed replica node has communicated to all other replica nodes its new network information. Keeping the historical configuration provides the changed replica with the ability to recognize the message from the other replica nodes as belonging to it, even though it is indicating an old hostname and port for the changed replica node.

In another embodiment, this storing of historical configurations is done temporarily to allow other replicas to potentially use the same host and port previously used by the replica node. Particularly, the previous configuration can be deleted once all the replica nodes have received the new UUID for the changed replica node, for example.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer implemented method for implementing a replica network configuration in a distributed system, the method comprising:
   generating a first time initialized replica cloud computing node that is assigned a computer readable storage medium and a processor;
   receiving, at the computer readable storage medium of the first time initialized replica cloud computing node, a network configuration of the first time initialized replica cloud computing node from a system administrator;
   in response to generating the first time initialized replica cloud computing node, automatically generating, using the processor of the first time initialized replica cloud computing node, a unique identifier (UUID) for the first time initialized replica cloud computing node; and
   changing at least one of a hostname and a port of the replica cloud computing node based on the network configuration and generating configuration data indicating the at least one changed hostname and changed port; and
   implementing a quorum based system in the replica network using the replica cloud computing node and the UUID comprising, wherein implementing the quorum based system comprises:
      generating a vote at the replica cloud computing node;
      transmitting the vote and the UUID of the replica cloud computing node to the system administrator; and
      authenticating, at the system administrator, the vote and confirming the vote is from the replica cloud computing node using the received UUID.

2. The method of claim 1, further comprising:
   transmitting the UUID for the first time initialized replica cloud computing node to a plurality of preexisting replica cloud computing nodes of the distributed system arranged in the replica network configuration;
   receiving, at the first time initialized replica cloud computing node, a plurality of preexisting UUIDs for the plurality of preexisting replica cloud computing nodes; and
   storing the plurality of preexisting UUIDs in the computer readable storage medium of the first time initialized replica cloud computing node.

3. The method of claim 2, further comprising:
   including the UUID in communications with at least one of the plurality of replica cloud computing nodes, wherein the plurality of replica cloud computing nodes identify the replica cloud computing node based on the UUID included in received communications.

4. The method of claim 2, further comprising:
   receiving a communication from at least one of the plurality of replica cloud computing nodes; and
   recognizing the at least one of the plurality of replica cloud computing nodes based on at least one of a plurality of UUIDs included in the communication from the at least one of the plurality of replica cloud computing nodes.

5. The method of claim 1, wherein automatically generating the UUID for the replica cloud computing node further comprises:
   receiving a plurality of UUIDs from a plurality of replica cloud computing nodes on the distributed system; and
   generating the UUID for the replica cloud computing node based on the plurality of UUIDs, wherein the generated UUID is different from each of the plurality of UUIDs.

6. The method of claim 1, wherein automatically generating the UUID for the replica cloud computing node further comprises:
   randomly generating the UUID as a randomly generated string of values.

7. The method of claim 1, further comprising:
   storing the UUID in the computer readable storage medium,
   wherein the computer readable storage medium is a persistent storage.

8. The method of claim 7, wherein the persistent storage includes a unique location reserved for the UUID.

9. The method of claim 2, wherein the computer readable storage medium stores the plurality of UUIDs in a persistent storage portion of the computer readable storage medium.

10. The method of claim 1, wherein the network configuration includes a host and a port.

11. The method of claim 1, further comprising:
    dynamically updating the network configuration of the replica cloud computing node.

12. The method of claim 11, wherein dynamically updating the network configuration of the replica cloud computing node comprises:
    changing the network configuration;
    pairing the changed network configuration and the UUID; and
    transmitting the paired network configuration and UUID to the plurality of replica cloud computing nodes.

13. The method of claim 2, further comprising:
    receiving a paired network configuration and UUID from the plurality of UUIDs from one of the plurality of replica cloud computing nodes; and
    storing the paired network configuration and UUID in the computer readable storage medium.

14. The method of claim 11, further comprising:
    storing a previous network configuration of the replica cloud computing node in the computer readable storage medium,
    wherein the previous network configuration is stored until the updated network configuration is transmitted to a plurality of replica cloud computing nodes of the distributed system arranged in the replica network configuration.

15. A system for implementing a replica network configuration in a distributed system, the system comprising:
    a memory having computer readable instructions; and
    one or more processors for executing the computer readable instructions, the computer readable instructions comprising:

generating a first time initialized replica cloud computing node that is assigned a computer readable storage medium and a processor;

receiving, at the computer readable storage medium of the first time initialized replica cloud computing node, a network configuration of the first time initialized replica cloud computing node from a system administrator;

in response to generating the first time initialized replica cloud computing node, automatically generating, using the processor of the first time initialized replica cloud computing node, a unique identifier (UUID) for the first time initialized replica cloud computing node;

transmitting the UUID for the first time initialized replica cloud computing node to a plurality of preexisting replica cloud computing nodes of the distributed system arranged in the replica network configuration; and storing the UUID in the computer readable storage medium, wherein the computer readable storage medium is a persistent storage;

receiving, at the first time initialized replica cloud computing node, a plurality of preexisting UUIDs for the plurality of preexisting replica cloud computing nodes;

storing the plurality of preexisting UUIDs in the computer readable storage medium of the first time initialized replica cloud computing node; and changing at least one of a hostname and a port of the replica cloud computing node based on the network configuration and generating configuration data indicating the at least one changed hostname and changed port, implementing a quorum based system in the replica network using the replica cloud computing node and the UUID comprising, wherein implementing the quorum based system comprises;

generating a vote at the replica cloud computing node;

transmitting the vote and the UUID of the replica cloud computing node to the system administrator; and authenticating, at the system administrator, the vote and confirming the vote is from the replica cloud computing node using the received UUID.

16. The system claim 15, further comprising:
dynamically updating the network configuration of the replica cloud computing node.

17. The system claim 16, wherein dynamically updating the network configuration of the replica cloud computing node comprises:
changing the network configuration;
pairing the changed network configuration and the UUID; and
transmitting the paired network configuration and UUID to the plurality of replica cloud computing nodes.

18. A computer program product for implementing a replica network configuration in a distributed system, the computer program product comprising a non-transitory computer readable storage medium having program instructions embodied therewith, the program instructions executable by a processor to cause the processor to:

generate a first time initialized replica cloud computing node that is assigned a computer readable storage medium and a processor;

receive, at the computer readable storage medium of the first time initialized replica cloud computing node, a network configuration of the first time initialized replica cloud computing node from a system administrator;

in response to generating the first time initialized replica cloud computing node, automatically generate, using the processor of the first time initialized replica cloud computing node, a unique identifier (UUID) for the of the first time initialized replica cloud computing node;

transmit the UUID to a plurality of replica cloud computing nodes of the distributed system arranged in the replica network configuration;

store the UUID in the computer readable storage medium, wherein the computer readable storage medium is a persistent storage;

transmitting the UUID for the first time initialized replica cloud computing node to a plurality of preexisting replica cloud computing nodes of the distributed system arranged in the replica network configuration;

receiving, at the first time initialized replica cloud computing node, a plurality of preexisting UUIDs for the plurality of preexisting replica cloud computing nodes;

storing the plurality of preexisting UUIDs in the computer readable storage medium of the first time initialized replica cloud computing node; and dynamically update the network configuration of the replica cloud computing node to change at least one of a hostname and a port of the replica cloud computing node based on the network configuration and generating configuration data indicating the at least one changed hostname and changed port, implementing a quorum based system in the replica network using the replica cloud computing node and the UUID comprising, wherein implementing the quorum based system comprises;

generating a vote at the replica cloud computing node;

transmitting the vote and the UUID of the replica cloud computing node to the system administrator; and authenticating, at the system administrator, the vote and confirming the vote is from the replica cloud computing node using the received UUID.

* * * * *